(12) United States Patent
Shin (10) Patent No.: US 11,558,464 B1
(45) Date of Patent: Jan. 17, 2023

(54) SYSTEM AND METHOD FOR CONTROLLING INTERNET OF THINGS DEVICE OF VEHICLE

(71) Applicants: Hyundai Motor Company, Seoul (KR); Kia Corporation, Seoul (KR)

(72) Inventor: Yong Woo Shin, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/650,105

(22) Filed: Feb. 7, 2022

(30) Foreign Application Priority Data

Jul. 9, 2021 (KR) .................. 10-2021-0090477

(51) Int. Cl.
*G16Y 40/35* (2020.01)
*H04L 67/12* (2022.01)

(52) U.S. Cl.
CPC .............. *H04L 67/12* (2013.01); *G16Y 40/35* (2020.01)

(58) Field of Classification Search
CPC .................. H04L 67/12; G16Y 40/35
See application file for complete search history.

(56) References Cited

U.S. PATENT DOCUMENTS

| 10,964,189 | B2 | 3/2021 | Pabla |
| 2018/0163655 | A1* | 6/2018 | Koo ............... F02D 41/064 |
| 2019/0387489 | A1* | 12/2019 | Idnani ............ H04L 12/2834 |
| 2020/0294380 | A1 | 9/2020 | Pabla |

FOREIGN PATENT DOCUMENTS

| KR | 10-1984940 B | 9/2019 |
| KR | 10-2058557 B | 12/2019 |
| WO | 20200190581 A | 9/2020 |

* cited by examiner

*Primary Examiner* — Jason D Recek
(74) *Attorney, Agent, or Firm* — McDonnell Boehnen Hulbert & Berghoff LLP (57) ABSTRACT

According to an embodiment of the present disclosure, a system for controlling an Internet-of-things (IoT) device of a vehicle may include at least one IoT device and a vehicle that determines whether a control condition is satisfied and calculate a first determination value based on the time at which the operation is controlled and the number of times the operation is controlled before or after a state in which the control condition is satisfied, calculates a second determination value based on a number of times the control condition is satisfied and a number of times the at least one IoT device is controlled in the state where the control condition is satisfied, and determines whether to automatically register the at least one IoT device as a control target based on the first determination value and the second determination value when the control condition is satisfied.

18 Claims, 5 Drawing Sheets

SYSTEM AND METHOD FOR CONTROLLING INTERNET OF THINGS DEVICE OF VEHICLE

CROSS-REFERENCE TO RELATED APPLICATION

This application claims the benefit of priority to Korean Patent Application No. 10-2021-090477, filed in the Korean Intellectual Property Office on Jul. 9, 2021, the entire contents of which are incorporated herein by reference.

TECHNICAL FIELD

The present disclosure relates to a system and a method for controlling an Internet-of-things (IoT) device of a vehicle.

BACKGROUND

A car-to-home service refers to a service for controlling an Internet-of-Things (IoT) device arranged in a specific place (e.g., home) in a vehicle. In general, the car-to-home service may control an IoT device through a vehicle terminal or a portable terminal linked to a vehicle. The car-to-home service may divide the mode into an outing mode or a going-home mode according to the moving direction of the vehicle, that is, whether the vehicle moves from home to another place or the vehicle moves from another place to home, and register at least IoT device. In addition, the car-to-home service may control at least one IoT device registered for each outing or going-home mode.

Therefore, when an IoT device is not registered in a vehicle in advance, it is impossible to use the car-to-home service. When a new IoT control operation is added to the control operation of the IoT device registered in advance for each outing mode or going-home mode, a user's reset may be required, which causes inconvenience to the user.

SUMMARY

The present disclosure has been made to solve the above-mentioned problems occurring in the prior art while advantages achieved by the prior art are maintained intact.

An aspect of the present disclosure provides a system and method for controlling an IoT device of a vehicle, which is capable of automatically registering an IoT device controlled corresponding to a use pattern of a user.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a system for controlling an Internet-of-things (IoT) device of a vehicle includes at least one IoT device that is arranged at a specific place to transmit time at which an operation is controlled during a specified period and a number of times an operation is controlled during the specified period, and a vehicle that determines whether a control condition is satisfied and calculate a first determination value based on the time at which the operation is controlled and the number of times the operation is controlled before or after a state in which the control condition is satisfied, calculates a second determination value based on a number of times the control condition is satisfied and a number of times the at least one IoT device is controlled in the state where the control condition is satisfied, and determines whether to automatically register the at least one IoT device as a control target based on the first determination value and the second determination value when the control condition is satisfied.

The vehicle may determine whether an outing mode control condition or a going home mode control condition is satisfied based on a starting state, a location of the vehicle, and a moving direction of the vehicle.

The vehicle may determine that the outing mode control condition is satisfied when the starting state of the vehicle is on, the location of the vehicle is the specific place, and the moving direction of the vehicle is a direction from the specific place to a different place.

The vehicle may determine that the going home mode control condition is satisfied when the starting state of the vehicle is off, the moving direction of the vehicle is a direction from a place different from the specific place to the specific place, and the location of the vehicle is the specific place.

The vehicle may calculate a weight based on the time when the control condition is satisfied and time when an operation of the at least one IoT device is controlled, and calculate the first determination value by reflecting the weight to the number of times the at least one IoT device is controlled.

The vehicle may calculate each time from the time when the control condition is satisfied to the time when the operation of the at least one IoT device is controlled, and calculate a value obtained by adding an inverse of each time as the weight.

The vehicle may calculate, as the second determination value, a ratio of the number of times the at least one IoT device is controlled in a state where the control condition is satisfied to the number of times the control condition is satisfied.

The vehicle may set a set registerable as the control target when the control condition is satisfied for the at least one IoT devices for which the first determination value exceeds a preset first reference value.

The vehicle may automatically register the registerable set as the control target when the control condition is satisfied for the registerable set in which the second determination value exceeds a preset second reference value and when the second determination value for the registerable set exceeds the preset second reference value.

According to another aspect of the present disclosure, a method of controlling an Internet-of-things (IoT) device of a vehicle includes transmitting, by at least one IoT device arranged at a specific place, time at which an operation is controlled during a specified period and a number of times an operation is controlled during the specified period, determining, by a vehicle, whether a control condition is satisfied and calculating a first determination value based on the time at which the operation is controlled and the number of times the operation is controlled before or after a state in which the control condition is satisfied, calculating, by the vehicle, a second determination value based on a number of times the control condition is satisfied and a number of times the at least one IoT device is controlled in the state where the control condition is satisfied, and determining whether to automatically register the at least one IoT device as a control target based on the first determination value and the second determination value when the control condition is satisfied.

The method may further include determining, by the vehicle, whether an outing mode control condition or a going home mode control condition is satisfied based on a starting state, a location of the vehicle, and a moving direction of the vehicle.

The vehicle may determine that the outing mode control condition is satisfied when the starting state of the vehicle is on, the location of the vehicle is the specific place, and the moving direction of the vehicle is a direction from the specific place to a different place.

The vehicle may determine that the going home mode control condition is satisfied when the starting state of the vehicle is off, the moving direction of the vehicle is a direction from a place different from the specific place to the specific place, and the location of the vehicle is the specific place.

The calculating of the first determination value may include calculating, by the vehicle, a weight based on the time when the control condition is satisfied and time when an operation of the at least one IoT device is controlled, and calculating, by the vehicle, the first determination value by reflecting the weight to the number of times the at least one IoT device is controlled.

The calculating of the weight may include calculating each time from the time when the control condition is satisfied to the time when the operation of the at least one IoT device is controlled, and calculating a value obtained by adding an inverse of each time as the weight.

The calculating of the second determination value may include calculating, as the second determination value, a ratio of the number of times the at least one IoT device is controlled in a state where the control condition is satisfied to the number of times the control condition is satisfied.

The method may further include setting a set registerable as the control target when the control condition is satisfied for the at least one IoT devices for which the first determination value exceeds a preset first reference value.

The method may further include automatically registering registerable set as the control target when the control condition is satisfied for the registerable set in which the second determination value exceeds a preset second reference value and when the second determination value for the registerable set exceeds the preset second reference value.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
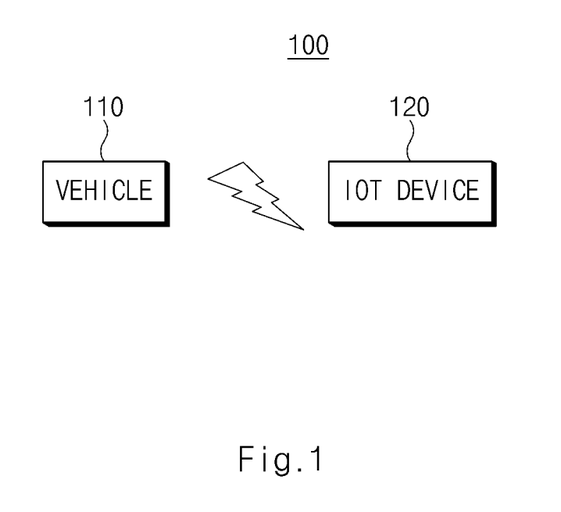
FIG. 1 is a diagram illustrating the configuration of a system for controlling an IoT device of a vehicle according to an embodiment of the present disclosure.

FIG. 1 is a diagram illustrating the configuration of a system for controlling an IoT device of a vehicle according to an embodiment of the present disclosure.

As shown in FIG. 1, a system 100 for controlling an IoT device of a vehicle may include a vehicle 110 and an IoT device 120.

The vehicle 110 may determine whether the control condition is satisfied, and receive time when an operation is controlled and the number of times the operation is controlled from at least one IoT device. The vehicle 110 may calculate a first determination value based on the time when the operation is controlled and the number of times the operation is controlled before or after a state in which the control condition is satisfied. The vehicle 110 may calculate a second determination value based on the number of times the control condition is satisfied and the number of times at least one IoT device is controlled in the state where the control condition is satisfied. The vehicle 110 may determine whether to automatically register the at least one IoT device as a control target based on the first determination value and the second determination value when the control condition is satisfied. The details will be described with reference to FIG. 2.

The IoT device 120 may be arranged in a specific place (e.g., home) and transmit operation information performed for a specified period to the vehicle 110. In this case, the operation information may include the time when the operation of the IoT device is controlled and the number of times the operation is controlled.

Figure 2:
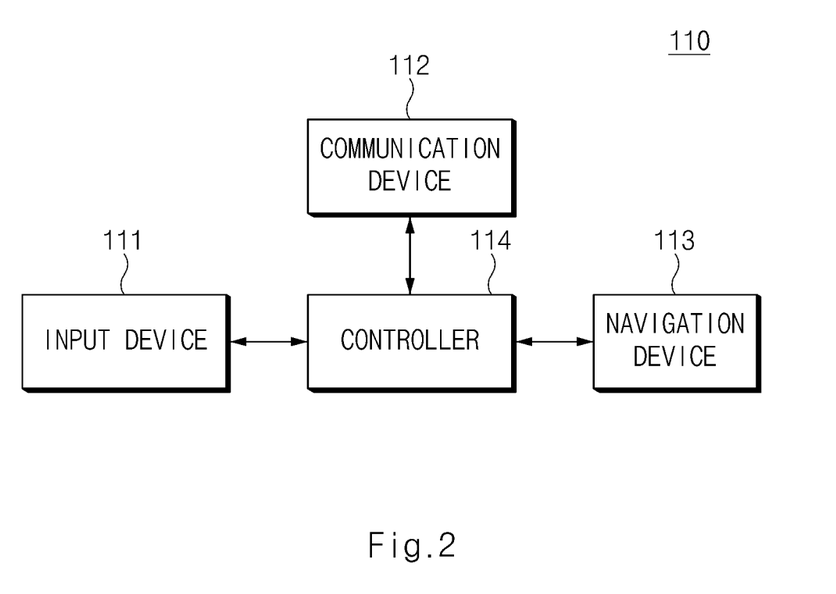
FIG. 2 is a diagram illustrating the configuration of a vehicle according to an embodiment of the present disclosure.

FIG. 2 is a diagram illustrating the configuration of a vehicle according to an embodiment of the present disclosure.

As shown in FIG. 2, the vehicle 110 may include an input device 111, a communication device 112, a navigation device 113, and a controller 114.

The input device 111 may receive an input signal corresponding to a user's manipulation, operation or voice. The controller 114 may generate a control signal corresponding to the input signal and transmit the control signal to the IoT device 120. According to an embodiment of the present disclosure, the input device 111 may be implemented with at least one of a scroll wheel, a button, a knob, a touch screen, a touch pad, a lever, a track ball, or the like that can be manipulated by a user-a motion sensor or a voice recognition sensor for sensing a user's motion or voice, or a combination thereof.

The communication device 112 may communication with the IoT device 120 through various wireless communication schemes such as Wi-Fi, WiBro, global system for mobile communication (GSM), code division multiple access (CDMA), wideband code division multiple access (WCDMA), universal mobile telecommunication system (UMTS), time division multiple access (TDMA), long term evolution (LTE), and the like. According to an embodiment of the present disclosure, the communication device 112 may receive the time when the operation of the IoT device is controlled and the number of times the operation is controlled during a specified time period. In addition, according to an embodiment, although not shown, the communication device 112 may communicate with a user's terminal in a wireless communication scheme to receive an input signal (corresponding to a signal for controlling the operation of the IoT device) input from the user's terminal and transmit the input signal to the controller 114.

The navigation device 113 may include a GPS receiver to receive the current location of the vehicle, provide the current location of the vehicle, and provide map image information of a certain area based on the current location of the vehicle.

The controller 114 may be implemented with various processing devices such as a microprocessor and the like in which a semiconductor chip capable of performing operations or executions of various commands is built-in, and may control operations of a vehicle according to an embodiment of the present disclosure.

First, the controller 114 may determine whether the control condition is satisfied. According to an embodiment of the present disclosure, it may be determined whether the outing mode control condition or the going-home mode control condition is satisfied based on the starting state, the current location of the vehicle, and the moving direction of the vehicle.

For example, when the starting state of the vehicle is on, the current location of the vehicle is a specific place, and the moving direction of the vehicle is from a specific place where the IoT device is arranged to a place different from the specific place, the controller 114 may determine that the outing mode control condition is satisfied. The controller 114 may determine the time when the outing mode control condition is satisfied as the time when the ignition is on.

In addition, when the starting state of the vehicle is off, the moving direction of the vehicle is a direction from a place different from the specific place where the IoT device is arranged to a specific place, and the current location of the vehicle is a specific place, the controller 114 may determine that the going-home mode control condition is satisfied. The controller 114 may determine a time when the going-home mode control condition is satisfied as a time when the starting state of the vehicle is off.

The controller 114 may collect operation information of the at least one IoT device controlled before or after a state in which the control condition is satisfied. According to an embodiment, the controller 114 may collect the time at which the at least one IoT device each is controlled and the number of times each controlled for a specified time period before or after a state in which the control condition is satisfied, and may store them in storage (not shown).

As an example, the controller 114 may collect operation information of the at least one IoT device controlled before the outing mode control condition was satisfied (the time when at least one IoT device was each controlled and the number of times the at least one IoT device was controlled), and store the collected information. As another example, the controller 114 may collect operation information of the at least one IoT device controlled after the going home mode control condition is satisfied (the time when at least one IoT device is each controlled and the number of times the at least one IoT device is controlled) for a specified time period, and may store the collected information.

The controller 114 may calculate a weight based on the time when the control condition is satisfied and the time when the at least one IoT device is controlled, and may calculate a first determination value by reflecting the weight to the number of times the at least one IoT device is controlled before or after the control condition is satisfied. According to an embodiment, the controller 114 may calculate each time from the time when the control condition is satisfied to the time when the at least one IoT device is controlled, and may calculate a value obtained by adding the inverse of each time as a weight. In this case, in calculating the weights in the above-described manner, the smaller the difference between the time when the control condition is satisfied and the time when the at least one IoT device is controlled, the higher the weight is given, so that it is determined that the intention to control the IoT device is high.

For example, when the controller 114 controls a light to be turned off before the outing mode control condition is satisfied, and when the light is controlled to be turned off three times for a specified time period, the number of times the at least one IoT device is controlled during the specified time period is 3 times. In addition, when it is assumed that the time at which the light was turned off before the outing mode control condition was satisfied were 3 minutes, 2 minutes, and 4 minutes ago, respectively, the controller 114 may calculate a weight by using Equation 1 and calculate the first determination value by using Equation 2.

$$\text{Weight} = 1/3 + 1/2 + 1/4 = 1.08 \qquad \text{<Equation 1>}$$

$$\text{First determination value} = 3*1.08 = 3.25 \qquad \text{<Equation 2>}$$

As another example, when the controller 114 controls the light to be turned on after the going home mode control condition is satisfied, and the light turned-on control is performed four times for a specified time period, the number of times the at least one IoT device is controlled for the specified period is 4 (four). In addition, when the time when the light is controlled to be turned on after the going home mode control condition is satisfied is 3 minutes, 4 minutes and 5 minutes, respectively, the controller 114 may calculate the weight by using Equation 3, the first determination value may be calculated by using Equation 4.

$$\text{Weight} = 1/3 + 1/4 + 1/5 = 0.78 \qquad \text{<Equation 3>}$$

$$\text{First determination value} = 4*0.78 = 3.13 \qquad \text{<Equation 4>}$$

The controller 114 may calculate a ratio of the number of times that at least one IoT device is controlled in a state where the control condition is satisfied with respect to the number of times the control condition is satisfied as the second determination value. For example, when the state in which the outing mode control condition is satisfied occurs 20 times during a specified time period, and the number of times that the at least one IoT device is controlled in the state in which the outing mode control condition is satisfied is 10 times during the specified time period, the controller 114 may calculate the second determination value as 50%. As another example, when the state in which the going-home mode control condition is satisfied occurs 20 times during the specified time period, and the number of times that the at least one IoT device is controlled in the state where the going home mode control condition is satisfied is 15 times for the specified time period, the controller 114 may calculate the second determination value as 75%.

When the first determination value for the at least one IoT device exceeds a preset first reference value, the controller 114 may determine that the user intends to control the at least one IoT device before going out or after returning home. In this case, the first reference value set in the state in which the outing mode control condition is satisfied may be identical to or different from that set in the state in which the going home mode control condition is satisfied.

The controller 114 may set at least one IoT device for which the first determination value exceeds a preset first reference value as a set registerable as a control target when the control condition is satisfied.

In addition, when the second determination value for the registerable set exceeds a preset second reference value, the controller 114 may automatically register the registerable set in which the second determination value exceeds the preset second reference value as the control target when the control condition is satisfied. In this case, the second reference value set in the state in which the outing mode control condition is satisfied may be identical to or different from that set in the state in which the going home mode control condition is satisfied.

When it is determined that the second determination value exceeds the second reference value, the controller 114 may determine that the probability that the IoT device will be controlled is high when the control condition is satisfied, and may automatically register the registerable set in which the second determination value exceeds the second reference value as the control target when the control condition is satisfied.

Figure 3:
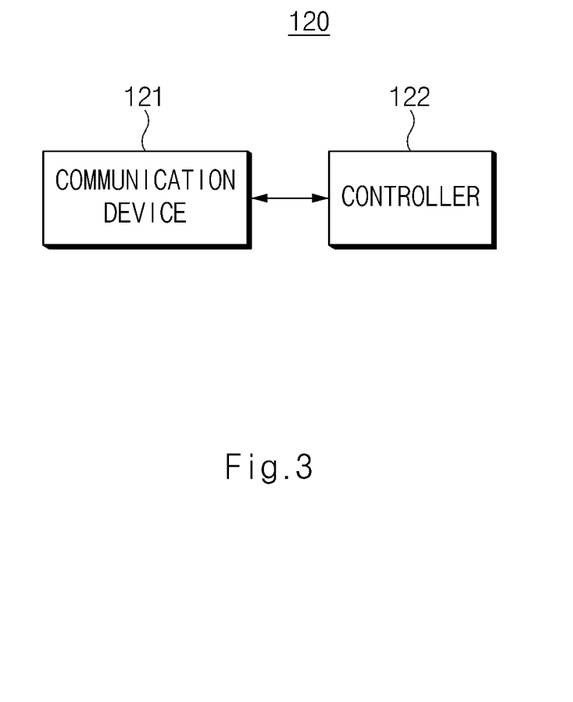
FIG. 3 is a diagram illustrating the configuration of an IoT device according to an embodiment of the present disclosure.

FIG. 3 is a diagram illustrating the configuration of an IoT device according to an embodiment of the present disclosure.

The IoT device 120 may include a communication device 121 and a controller 122.

The communication device 121 may communication with the vehicle 110 in various wireless communication schemes such as Wi-Fi, WiBro, global system for mobile communication (GSM), code division multiple access (CDMA), wideband code division multiple access (WCDMA), universal mobile telecommunication system (UMTS), time division multiple access (TDMA), long term evolution (LTE), and the like. According to an embodiment of the present disclosure, the communication device 121 may transmit operation information to the vehicle 110. In addition, a control signal may be received from the vehicle 110.

The controller 122 may be implemented with various processing devices such as a microprocessor and the like in which a semiconductor chip capable of performing operations or executions of various commands is built-in, and may control operations of an IoT device according to an embodiment of the present disclosure. According to an embodiment, when receiving a control signal from the vehicle 110, the controller 122 may control the operation.

Figure 4:
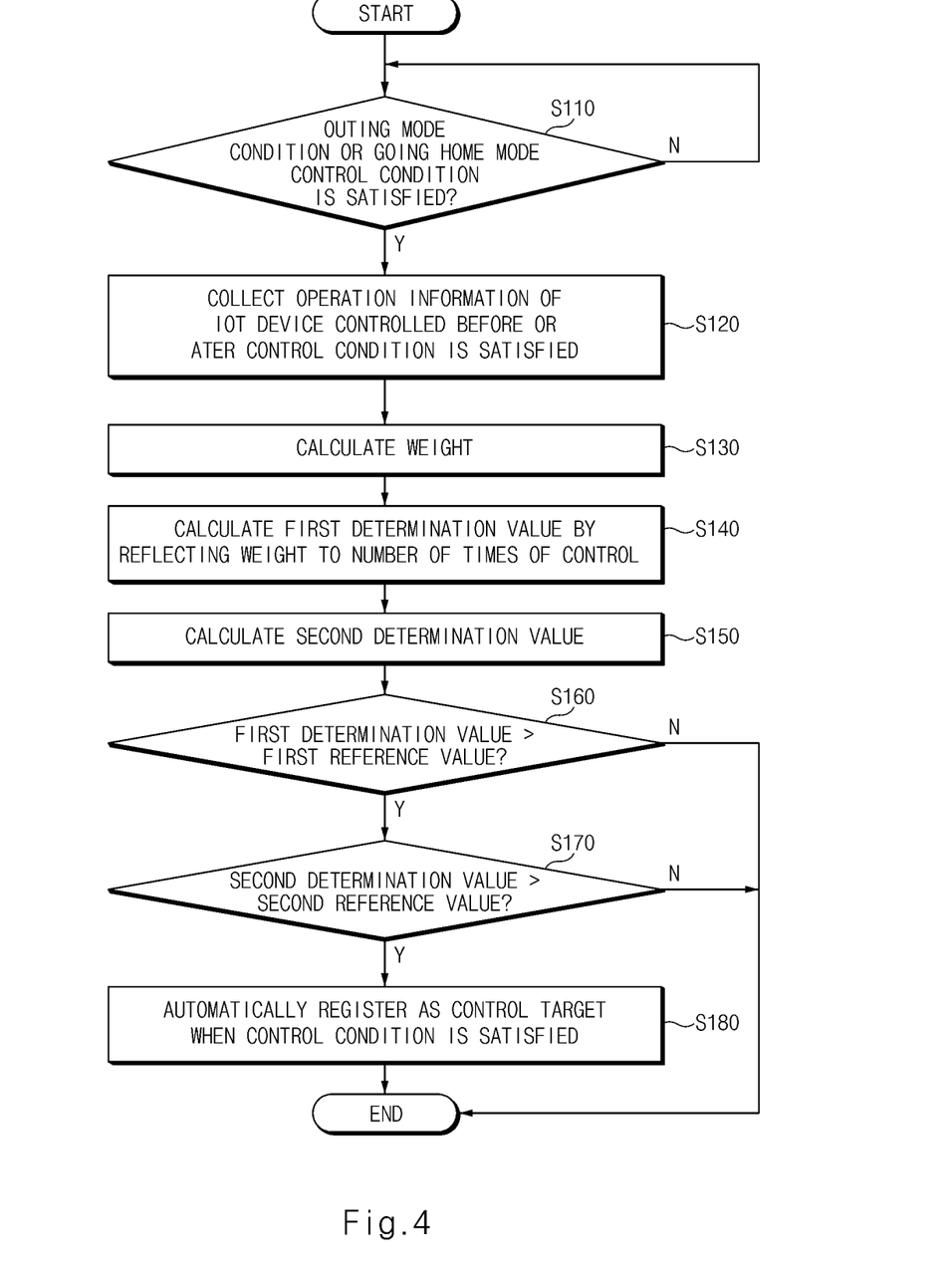
FIG. 4 is a flowchart illustrating a method of controlling an IoT device of a vehicle according to an embodiment of the present disclosure.

FIG. 4 is a flowchart illustrating a method of controlling an IoT device of a vehicle according to an embodiment of the present disclosure.

As shown in FIG. 4, in S110, the vehicle 110 may determine whether the control condition is satisfied. According to an embodiment, in S110, the vehicle 110 may determine whether the outing mode control condition or the going home mode control condition is satisfied based on the starting state, the current location of the vehicle, and the moving direction of the vehicle.

For example, when the starting state of the vehicle is on, the current location of the vehicle is a specific place, and the moving direction of the vehicle is from a specific place where the IoT device is arranged to a different place from the specific place, the vehicle 110 may determine that the outing mode control condition is satisfied. In addition, when the starting state of the vehicle is off, the moving direction of the vehicle is a direction from a place different from the specific place where the IoT device is arranged to the specific place, and the current location of the vehicle is the specific place, the vehicle 110 may determine that the going-home mode control condition is satisfied.

In S120, the vehicle 110 may collect operation information of the at least one IoT device controlled before or after a state in which the control condition is satisfied. According to an embodiment, in S120, the vehicle 110 may collect the time at which the at least one IoT device each is controlled and the number of times each controlled for a specified time period before or after a state in which the control condition is satisfied, and may store them in storage (not shown).

For example, the vehicle 110 may collect operation information of the at least one IoT device controlled before the outing mode control condition was satisfied (the time when at least one IoT device was each controlled and the number of times the at least one IoT device was controlled), and store the collected information. As another example, the vehicle 110 may collect operation information of the at least one IoT device controlled after the going home mode control condition is satisfied (the time when at least one IoT device is each controlled and the number of times the at least one IoT device is controlled) for a specified time period, and may store the collected information.

In S130, the vehicle 110 may calculate a weight based on the time when the control condition is satisfied and the time when the at least one IoT device is controlled. In this case, the time when the control condition is satisfied may include time when the outing mode control condition is satisfied and time when the going home mode control condition is satisfied. The time when the outing mode control condition is satisfied may include time when the starting state is on state, and the time when the going home mode control condition is satisfied may include time when the starting state is off.

According to an embodiment, in S130, the vehicle 110 may calculate each time from the time when the control condition is satisfied to the time when the at least one IoT device is controlled, and may calculate a value obtained by adding the inverse of each time as a weight.

For example, when the vehicle 110 controls a light to be turned off before the outing mode control condition is satisfied, and when the light is controlled to be turned off three times for a specified to time period, the number of times the at least one IoT device is controlled during the specified time period is 3 times. In addition, when it is assumed that the time at which the light was turned off before the outing mode control condition was satisfied were 3 minutes, 2 minutes, and 4 minutes ago, respectively, the vehicle 110 may calculate a weight by using Equation 1 described above.

As another example, when the vehicle 110 controls the light to be turned on after the going home mode control condition is satisfied, and the light turned-on control is performed four times for a specified time period, the number of times the at least one IoT device is controlled for the specified period is 4 (four). In addition, when the time when the light is controlled to be turned on after the going home mode control condition is satisfied is 3 minutes, 4 minutes and 5 minutes, respectively, the vehicle 110 may calculate the weight by using Equation 3.

In S140, the vehicle 110 may calculate the first determination value by reflecting the weight to the number of times the at least one IoT device is controlled before or after the control condition is satisfied. According to an embodiment, in S140, when the outing mode control condition is satisfied, the vehicle 110 may calculate the first determination value by using Equation 2 described above. In addition, when the going home mode control condition is satisfied, the vehicle 110 may calculate the first determination value by using Equation 4 described above.

In S150, the vehicle 110 may calculate a ratio of the number of times that at least one IoT device is controlled in a state where the control condition is satisfied with respect to the number of times the control condition is satisfied as the second determination value.

According to an embodiment, in S150, when the state in which the outing mode control condition is satisfied occurs 20 times during a specified time period, and the number of times that the at least one IoT device is controlled in the state in which the outing mode control condition is satisfied is 10 times during the specified time period, the vehicle 110 may calculate the second determination value as 50%. As another example, when the state in which the going-home mode control condition is satisfied occurs 20 times during the specified time period, and the number of times that the at least one IoT device is controlled in the state where the going home mode control condition is satisfied is 15 times for the specified time period, the vehicle 110 may calculate the second determination value as 75%.

In S160, the vehicle 110 may determine whether the first determination value for at least one IoT device exceeds the preset first reference value. In this case, the first reference value set in the state in which the outing mode control condition is satisfied may be identical to or different from that set in the state in which the going home mode control condition is satisfied.

In S160, when the first determination value for at least one IoT device exceeds the preset first reference value (Y), the vehicle 110 may set at least one IoT device for which the first determination value exceeds a preset first reference value as a set registerable as a control target when the control condition is satisfied. In S160, when the first determination value for at least one IoT device does not exceed the preset first reference value (N), the vehicle 110 may terminate the operation.

In S170, the vehicle 110 may determine whether the second determination value for the registerable set exceeds a preset second reference value. In this case, the second reference value set in the state in which the outing mode control condition is satisfied may be identical to or different from that set in the state in which the going home mode control condition is satisfied.

When it is determined in S170 that the second determination value for the registerable set exceeds the preset second reference value (Y), in S180, the vehicle 110 may automatically register the registerable set in which the second determination value exceeds the preset second reference value as the control target when the control condition is satisfied. When it is determined in S170 that the second determination value for at least one IoT device does not exceed the preset second reference value (N), the vehicle 110 may terminate the operation.

Figure 5:
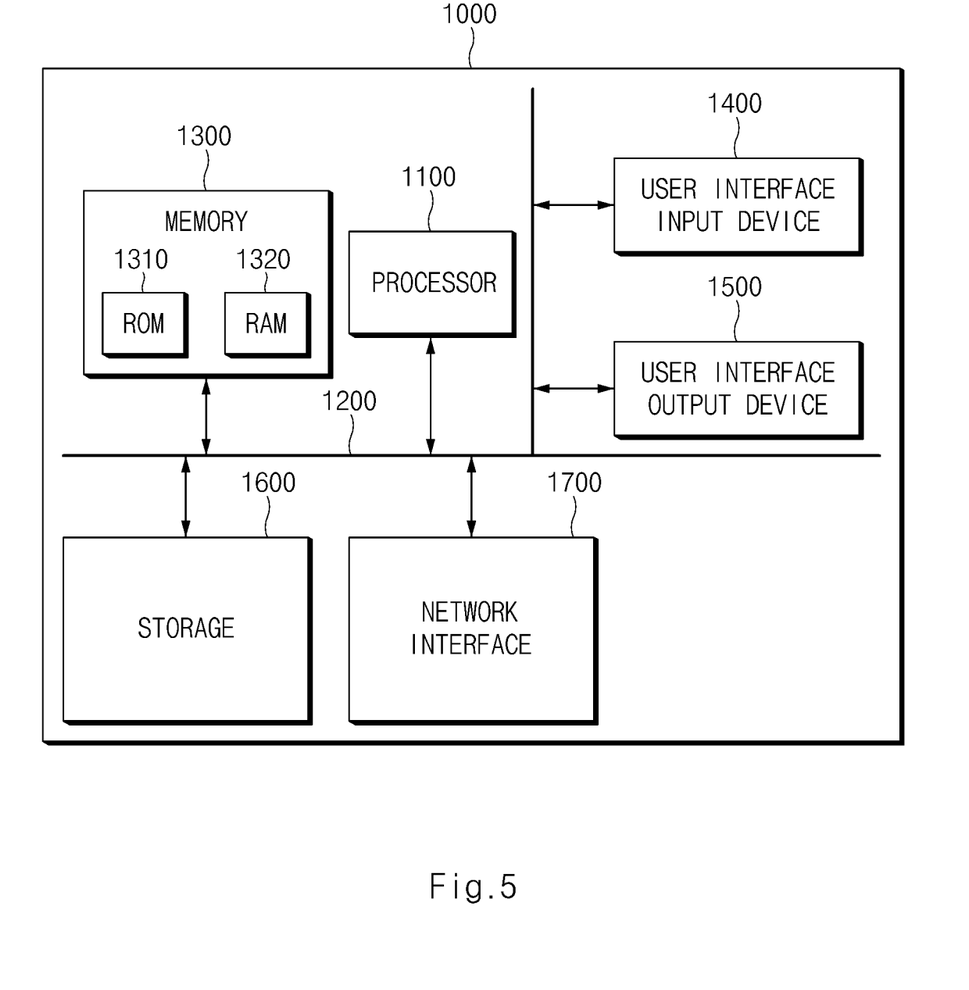
FIG. 5 is a block diagram illustrating a computing system for executing a method according to an embodiment of the present disclosure.

FIG. 5 is a block diagram illustrating a computing system for executing a method according to an embodiment of the present disclosure.

Referring to FIG. 5, a computing system 1000 may include at least one processor 1100, a memory 1300, a user interface input device 1400, a user interface output device 1500, storage 1600, and a network interface 1700 connected through a bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to the embodiments of the present disclosure, the system and method for controlling an IoT device of a vehicle may improve the convenience of a user using the car-to-home service by learning the usage pattern of the IoT device controlled according to the user's usage pattern based on the vehicle's location and automatically registering the usage pattern.

Although exemplary embodiments of the present disclosure have been described for illustrative purposes, those skilled in the art will appreciate that various modifications, additions and substitutions are possible, without departing from the scope and spirit of the disclosure.

Therefore, the exemplary embodiments disclosed in the present disclosure are provided for the sake of descriptions, not limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. A system for controlling an Internet-of-things (IoT) device of a vehicle, the system comprising:
   at least one IoT device arranged at a specific place to transmit time at which an operation is controlled during a specified period and a number of times an operation is controlled during the specified period; and
   a vehicle configured to determine whether a control condition is satisfied and calculate a first determination value based on the time at which the operation is controlled and the number of times the operation is controlled before or after a state in which the control condition is satisfied, calculate a second determination value based on a number of times the control condition is satisfied and a number of times the at least one IoT device is controlled in the state where the control condition is satisfied, and determine whether to automatically register the at least one IoT device as a control target based on the first determination value and the second determination value when the control condition is satisfied.

2. The system of claim 1, wherein the vehicle is configured to determine whether an outing mode control condition or a going home mode control condition is satisfied based on a starting state, a location of the vehicle, and a moving direction of the vehicle.

3. The system of claim 2, wherein the vehicle is configured to determine that the outing mode control condition is satisfied when the starting state of the vehicle is on, the location of the vehicle is the specific place, and the moving direction of the vehicle is a direction from the specific place to a different place.

4. The system of claim 2, wherein the vehicle is configured to determine that the going home mode control condition is satisfied when the starting state of the vehicle is off, the moving direction of the vehicle is a direction from a place different from the specific place to the specific place, and the location of the vehicle is the specific place.

5. The system of claim 1, wherein the vehicle is configured to calculate a weight based on the time when the control condition is satisfied and time when an operation of the at least one IoT device is controlled, and calculate the first determination value by reflecting the weight to the number of times the at least one IoT device is controlled.

6. The system of claim 5, wherein the vehicle is configured to calculate each time from the time when the control condition is satisfied to the time when the operation of the at least one IoT device is controlled, and calculate a value obtained by adding an inverse of each time as the weight.

7. The system of claim 1, wherein the vehicle is configured to calculate, as the second determination value, a ratio of the number of times the at least one IoT device is controlled in a state where the control condition is satisfied to the number of times the control condition is satisfied.

8. The system of claim 1, wherein the vehicle is configured to set a set registerable as the control target when the control condition is satisfied for the at least one IoT devices for which the first determination value exceeds a preset first reference value.

9. The system of claim 8, wherein the vehicle is configured to automatically register the registerable set as the control target when the control condition is satisfied for the registerable set in which the second determination value exceeds a preset second reference value and when the second determination value for the registerable set exceeds the preset second reference value.

10. A method of controlling an Internet-of-things (IoT) device of a vehicle, the method comprising
transmitting, by at least one IoT device arranged at a specific place, time at which an operation is controlled during a specified period and a number of times an operation is controlled during the specified period;
determining, by a vehicle, whether a control condition is satisfied and calculating a first determination value based on the time at which the operation is controlled and the number of times the operation is controlled before or after a state in which the control condition is satisfied;
calculating, by the vehicle, a second determination value based on a number of times the control condition is satisfied and a number of times the at least one IoT device is controlled in the state where the control condition is satisfied; and
determining whether to automatically register the at least one IoT device as a control target based on the first determination value and the second determination value when the control condition is satisfied.

11. The method of claim 10, further comprising:
determining, by the vehicle, whether an outing mode control condition or a going home mode control condition is satisfied based on a starting state, a location of the vehicle, and a moving direction of the vehicle.

12. The method of claim 11, wherein the vehicle determines that the outing mode control condition is satisfied when the starting state of the vehicle is on, the location of the vehicle is the specific place, and the moving direction of the vehicle is a direction from the specific place to a different place.

13. The method of claim 11, wherein the vehicle determines that the going home mode control condition is satisfied when the starting state of the vehicle is off, the moving direction of the vehicle is a direction from a place different from the specific place to the specific place, and the location of the vehicle is the specific place.

14. The method of claim 10, wherein the calculating of the first determination value includes:
calculating, by the vehicle, a weight based on the time when the control condition is satisfied and time when an operation of the at least one IoT device is controlled; and
calculating, by the vehicle, the first determination value by reflecting the weight to the number of times the at least one IoT device is controlled.

15. The method of claim 14, wherein the calculating of the weight includes:
calculating each time from the time when the control condition is satisfied to the time when the operation of the at least one IoT device is controlled, and calculating a value obtained by adding an inverse of each time as the weight.

16. The method of claim 10, wherein the calculating of the second determination value includes:
calculating, as the second determination value, a ratio of the number of times the at least one IoT device is controlled in a state where the control condition is satisfied to the number of times the control condition is satisfied.

17. The method of claim 10, further comprising:
setting a set registerable as the control target when the control condition is satisfied for the at least one IoT devices for which the first determination value exceeds a preset first reference value.

18. The method of claim 17, further comprising:
automatically registering the registerable set as the control target when the control condition is satisfied for the registerable set in which the second determination value exceeds a preset second reference value and when the second determination value for the registerable set exceeds the preset second reference value.

* * * * *